G. SANFORD.
Power Churn.
No. 8,927.
Patented May 4, 1852.
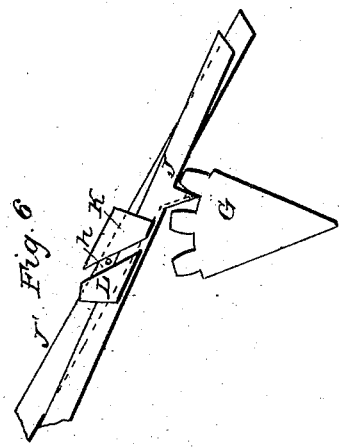
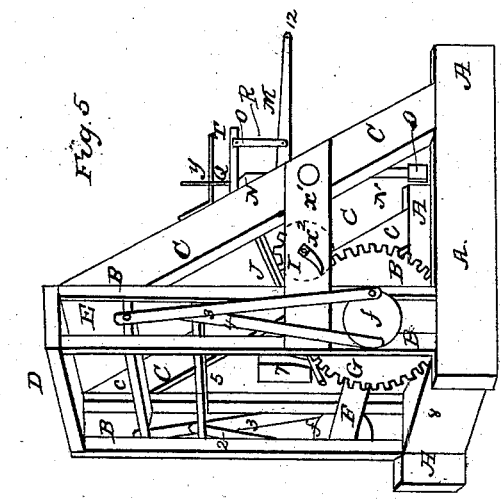
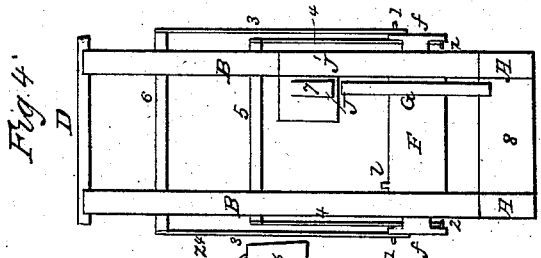
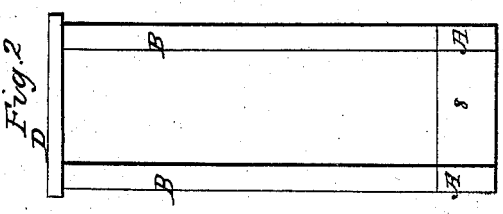
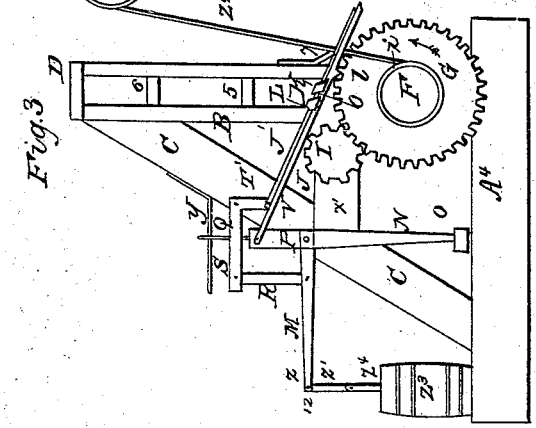
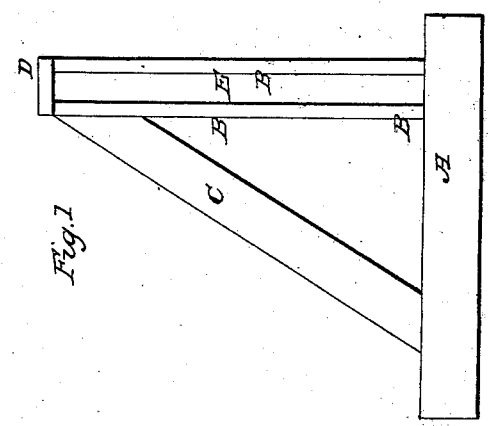

UNITED STATES PATENT OFFICE.

GELSTON SANFORD, OF ELLENVILLE, NEW YORK, ASSIGNOR TO GEO. A. MEACHAM.

CHURNING-MACHINE.

Specification of Letters Patent No. 8,927, dated May 4, 1852.

*To all whom it may concern:*

Be it known that I, GELSTON SANFORD, of Ellenville, in the county of Ulster and State of New York, have invented certain new and useful Improvements in Churning-Machines and Combining Them with Cheese-Presses; and I do hereby declare that the following is a full, clear, and exact description thereof, reference being had to the annexed drawings, making part of this specification, in which like letters and numbers in the different figures designate like parts.

Figure I is a side elevation of the frame work. Fig. II is a back elevation of the frame work. Fig. III is a section showing the levers and wheels; also the churn, and the rope and weight giving the motion. Fig. IV is a back elevation of the whole machine. Fig. V is a perspective view. Fig. VI is a detached view, on a larger scale, of a segment of the wheel G and the levers I and I', the concealed portion of I' being shown in dotted lines—in which they are shown in position when the wedge K is first rising up the pins.

I construct the machine as shown by the annexed drawings. First I build the frame work, shown in Figs. I and II, of wood (although metal may be used). A and A are the bed pieces connected together by girths 8. B B are uprights resting on beds A, A. They are parallel to each other. D is a tie, which keeps uprights in their places. C, C, are braces resting on beds A, A, and leaning against uprights B. E, E are slots cut in uprights B, B to receive the ends of followers 5 and 6 of the cheese presses.

The different parts of the frame are mortised and tenoned, or fastened in any known way. I next construct a shaft (F) which rests in journal boxes in uprights B, B. On the shaft I key a spur wheel G. I next construct a pinion I to mesh in spur wheel G. Through the pinion I and keyed fast to it I run a shaft which rests in journal boxes in iron cross pieces X'.

J is a long dog or pawl with a tooth on the under side which fits in the spur wheel G. The upper end is pinned fast to pendulum rod N by pin W.

J' is a pawl or dog like J with its upper end pinned fast to the triangular lever T by pin V. In nearly the center of pawl J' I firmly fix an iron or steel pin $h$. I then construct the wedges K and L and fasten them to lever I by thumb screws or any other convenient way. These wedges are so arranged that the bottom of wedge K rests on pin $h$ and the pin $h$ rests on top of wedge L.

M is an arm one end of which is fast to pendulum rod N at right angles with it. When the pendulum rod vibrates then the arm M must also vibrate.

N is a pendulum rod hung on the pin P. The upper end of the rod is iron and hammered smooth, so as to form a spring.

O is a weight or pendulum fastened to the lower end of rod N.

R is a bar, connecting arm M, by means of pin S', to the angled lever T, by means of pin S.

T is an angled lever hung on the pin $n$ and connected at one end to bar R and at the other to pawl J' by pin V.

Y is a thin plate of iron or brass one end of which is fast to the brace and is bent out horizontal to the uprights. In this plate is cut a slot wide enough to admit the spring Q, and each end of the slot acts as a bumper for the spring when the machine is in motion.

Z is a pin stuck in the shaft F for the purpose of fastening thereto a cord.

&, &, are collars fast to the ends of shaft F.

1, 1, are crank pins on the outside of collars & &.

2, 2, are crank pins on the inside of collars & & and on the opposite side of the circle.

3, 3, are connecting rods connecting pins 1, 1, to the upper follower 6.

4, 4 are connecting rods, connecting pins 2, 2 to the lower follower 5.

5 is a follower, the ends of which fit in slots E, E, in uprights B, B. 6 is also a follower with the ends fitting in slots E, E in the uprights B, B.

8 are the girths connecting beams or beds A, A.

7 is a spring made of thin iron and one end fast to the upright B, and the other end resting on the pawls, J, J', acting as a spring and keeping them from flying out of gear of wheel G.

X', X' are iron plates extending on each side of the frame from braces C, C, to uprights B, B, for the purpose of supporting the shaft of pinion I.

$X^2$ is a handle or crank keyed fast to the same shaft that pinion I is.

From the farther end of arm M, at pin 12, I fasten a short lever, at the lower end of which lever I attach the dasher of the churn. This lever is shown in Fig. III by $Z^1$, the dasher by $Z^2$ and the churn by $Z^3$. I then wind a rope or cord $Z^4$ around the shaft F, with one end fast to pin Z and the other end extended up over pulley $Z^5$ and attached to weight $Z^6$. If the height and situation of the machine will not allow sufficient run to the weight the pulley $Z^5$ may be fastened to some part of tie D and the weight then will have run enough (from the pulley to the ground). The machine is now ready for use. To use it for operating a churn dasher, place churn directly under the farther end of arm M, let the top of the dasher handle be connected to the end of arm M by a lever $Z^1$ pinned with pin 12—all shown in Fig. III. Next unconnect the connecting rods 3, 3, 4, 4, from pins 1, 1, 2, 2, then turn the crank $X^2$ in the direction indicated by the arrow close to it. This will turn the pinion and spur wheel and shaft and thus wind up the weight. The pinion is then pulled one side, so as to slip out of gear from spur wheel G. The weight will turn the spur wheel in the direction indicated by the arrow marked thereon. The arrangement of the pawls is such that the wheel G as it turns back will catch first pawl J and as pawl J is forced back by means of the other levers the pawl $J^1$ is forced forward. As the pawl J goes back and the pawl $J^1$ comes forward the pin $h$ strikes the bottom of wedge K and the wedge K rises up on the pin and raises the pawl J out of gear; and as the lever makes the contrary motion the pin $h$ strikes the wedge L on the top and the pin raises up and lifts pawl $J^1$ out of gear, so that by means of the wedges the pawls are made to trip each other. As the pawls are respectively driven back, the proper motion is given to the dasher by means of the pendulum rod, the arm and levers. The pendulum and spring on the pendulum rod serve to steady the motion of the machine. The machine will operate till the weight runs down, when if the churning is not through, the weight must be wound up again, in the same manner as before.

To operate the cheese press raise both pawls out of gear and hold them so, either by sticking a pin under them and in the uprights B or by fastening them up by a cord. Then push the pinion I in gear with spur-wheel G, connect the connecting rods 3, 3, pins 1, 1, and the connecting rods 4, 4, with pins 2, 2, then turn the crank $X^2$ till the pins 1, 1, and 2, 2, are in a line with the ends of the followers, the pins 1, 1, being uppermost, then put in the cheese between followers 6 and 5 and turn the crank $X^2$ either way and the follower 6 will come down and the follower 5 will go up and the cheese will be pressed.

The advantage of the churning arrangement is, by means of the dogs that trip each other, getting a cheap, simple and direct method of getting the proper motion by means of the weight. The advantage of combining the cheese press with it is the machine is so arranged that the principal parts of both machines answer for either purpose.

Having thus fully described my invention, what I claim therein as new and desire to secure by Letters Patent is—

The arrangement of dogs or pawls J, J' and pin $h$ with wedges K, L for the purpose of tripping each other.

GELSTON SANFORD.

Witnesses:
 HARVEY HOMES,
 DANIEL PIERCE.